Patented Nov. 4, 1947

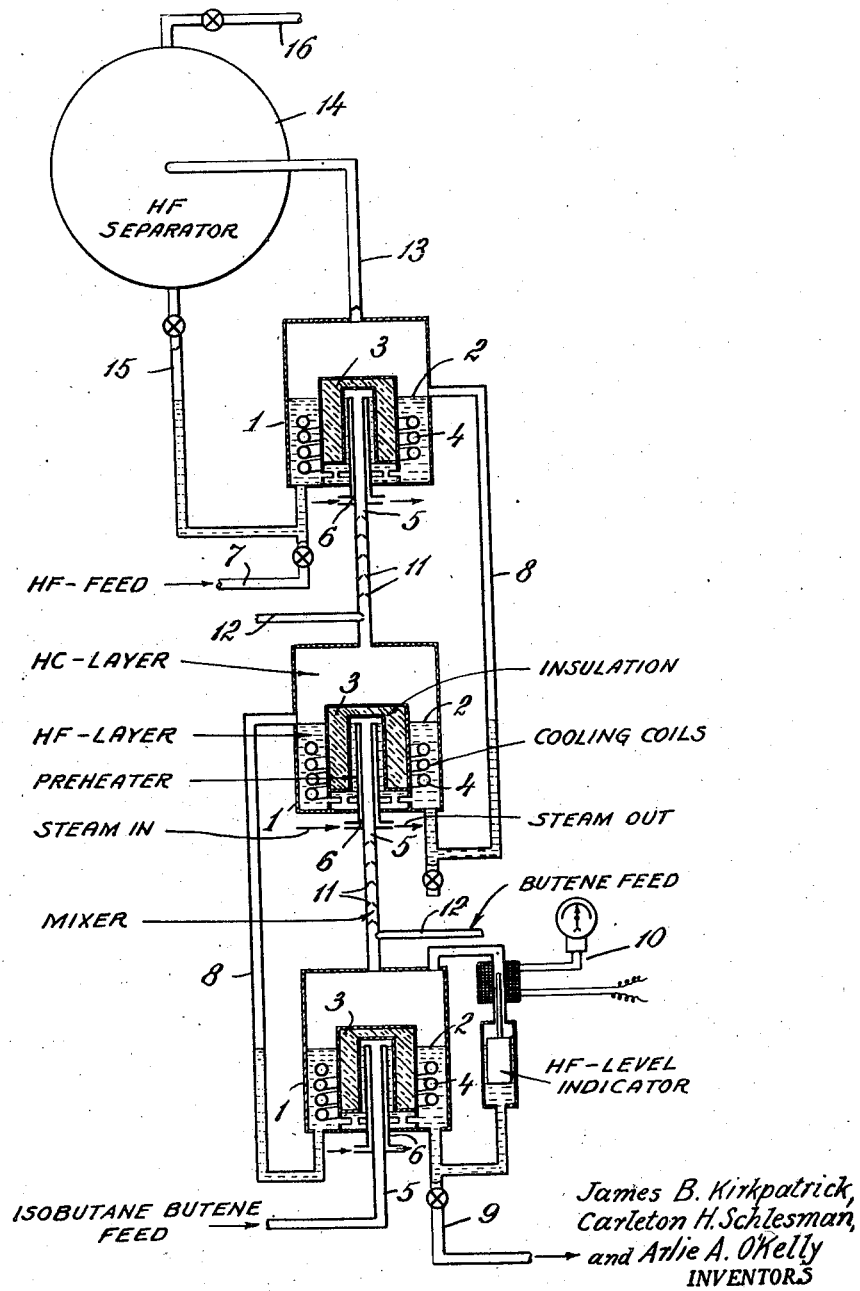

2,430,228

UNITED STATES PATENT OFFICE 2,430,228

MULTISTAGE HF ALKYLATION OF ISO-PARAFFINS BY MEANS OF OLEFINS

James B. Kirkpatrick, Woodbury, Carleton H. Schlesman, Camden, and Arlie A. O'Kelly, Woodbury, N. J., assignors to Socony-Vacuum Oil Company, Incorporated, a corporation of New York Application January 25, 1944, Serial No. 519,616

1 Claim. (Cl. 260—683.4)

This invention relates to synthesis of valuable hydrocarbons by condensation of hydrocarbon reactants in the presence of a liquid acid catalyst to obtain hydrocarbon products of higher molecular weight than the charge hydrocarbons.

Important among such reactions are alkylation of paraffins, particularly isoparaffins, with olefins and polymerization of olefins. Typical catalysts are hydrogen fluoride, sulfuric acid and phosphoric acid. The effect of various liquid acid catalysts in such reactions has received considerable attention and the effects of temperature control have also been studied. It is the general belief in the art that reactions of this type require rather close temperature control in order to obtain the desired selectivity of reaction. For the most part, the exercise of temperature control involves abstraction of heat generated by the reaction. It has been the practice to control reaction temperatures by control of the temperature of material supplied as feed stock and catalyst as well as by abstraction of heat from the reaction mass itself.

A further common characteristic of processes of the above class has been the practice of obtaining the desired intimate contact by violent agitation of a two-phase liquid system. Very expensive "contactors" having high power requirements for agitation of the liquid mass are conventional equipment. The present invention provides means for obtaining proper contact between reactants and catalyst without agitation of the reaction mass. The invention is also adapted to take advantage of the very marked advantages in nature and course of the reaction obtained by preheating the reactants charged to the system. This is the concept described in the prior copending application Serial No. 490,487, filed June 11, 1943, by Arlie A. O'Kelly and Jacob R. Meadow.

The present invention provides apparatus of relatively simple and inexpensive nature for conducting reactions of the type defined above. According to the present invention, a plurality of reaction zones are provided; each adapted for passage of hydrocarbons upwardly in subdivided form through a body of liquid acid catalyst. Each of the zones is connected to two other similar zones in order that catalyst may flow from zone to zone through the system in one direction while hydrocarbons flow from zone to zone through the system in the opposite direction. This results in countercurrent contact between catalyst and hydrocarbons through the system while permitting separate control of conditions of reaction and concentration of reactants in each stage.

Reference is made to the attached drawing, comprising a single figure illustrating diagrammatically a preferred embodiment of the invention. The plant shown includes three units, each comprising a reaction vessel 1 having a body of liquid catalyst in the lower part and a body of hydrocarbon thereabove, the interface between the two liquid phases being indicated at 2. Within each vessel 1 is a device 3 for admitting hydrocarbons, near the bottom of the vessel, into the body of catalyst. In the form shown, this device is somewhat in the nature of a bubble cap formed of heat insulating material to permit charging hydrocarbons at a substantial preheat without upsetting heat control of the body of catalyst. Disposed within the body of catalyst is a heat exchange coil 4 to maintain the reaction zone at the desired temperature by removing heat of reaction and heat put into the system by charge preheat, if any.

The charge is admitted to the inside of the bubble cap by a pipe 5 which has a jacket 6 about it for use in preheating the charge. Steam or other heat exchange medium passed through the jacket 6 serves to preheat or otherwise affect the temperature of the charge as it flows through the pipe 5 and bubble cap 3.

The several reaction vessels 1 are preferably disposed in vertically spaced relation to each other in order that flow of the catalyst may be induced by gravity, although pumps may be used for this purpose. Fresh catalyst is introduced to the system at the uppermost vessel 1 by means of a pipe 7 and catalyst flows from each vessel to a vessel lower in the series by pipes 8 which have intakes placed at the points desired for hydrocarbon-acid interfaces. Fresh catalyst may be added or may replace part or all of the catalyst flowing downwardly through the series by insertion of suitable connections for that purpose in the pipes 8. Catalyst is withdrawn by pipe 9 and may thereafter be treated in conventional manner to regenerate it for reuse in the process.

Some sort of indicator of interface level in the lowest reactor is desirable and there is illustrated here a float actuated electric indicator shown at 10.

The flow of hydrocarbons through the system is in the direction opposite to that of catalyst flow. Fresh feed is introduced to the system at the lowest reactor by pipe 5 and hydrocarbons are withdrawn from the top of that reactor and passed by the second pipe 5 to the next higher reactor. Additional charge may, and preferably is introduced at this point through pipe 12 and mixed with the material withdrawn from the first reactor, as by orifice mixers 11 in the line 5. A similar arrangement is found between each pair of adjacent reactors in the series. At the highest reactor hydrocarbon is withdrawn by pipe 13 and passed to a settling zone 14 wherein catalyst entrained in the hydrocarbon is permitted to settle out and is returned to the same reactor by pipe 15. Product is withdrawn from the separator 14 by line 16.

In a typical use of the apparatus shown, isobutane is alkylated with butenes in the presence of hydrogen fluoride. The catalyst is continuously introduced at 7 and withdrawn at 9 while strongly selective alkylation is practiced by varying the paraffin to olefin ratio at different charge lines. The catalyst in each of the reactors is maintained at 50° to 60° F. and the charge to each reactor is preheated to about 175° F. at each stage. The charge to the first reactor has a molar ratio of 20 to 1 (paraffin to olefin). Between the first and second reactors, an equal quantity of charge having a molar ratio of 10 to 1 is added while the charge to the third reactor included product and unreacted hydrocarbons from the first two reactors plus a third charge equal in quantity to the first but having a molar ratio of 5 to 1.

In a typical operation according to the invention, a mixture of isobutane and butenes containing 8% olefin was preheated to 210° F. and charged at 220 pounds per square inch through an atomizing device into the bottom of a body of hydrogen fluoride at 100° F. and 120 pounds' pressure. The hydrocarbons were withdrawn from above the acid, mixed with 9.3% by weight of butenes and charged to hydrogen fluoride under the conditions recited above. The alkylate so produced had an octane number of 89.8 and a fluorine content of 0.0043%.

By comparison, a run made in a single reactor under identical conditions but charging an amount of olefin equivalent to that added in both the above stages produced an alkylate having an octane number of 88.6 and a fluorine content of 0.0081%.

The distillation data tabulated below shows further advantages inherent in the multiple stage operation:

|   |   | Two-stage | One-stage |
|---|---|---|---|
| 1 | 20–30° C. (Isopentane cut) | 7.8 | 6.7 |
| 2 | 30–90° C. | 11.2 | 10.6 |
| 3 | 90–125° C. (Octane cut) | 63.6 | 58.2 |
| 4 | 125–190° C. | 10.4 | 14.2 |
| 5 | Residue | 7.0 | 10.3 |

We claim:

A process for alkylation reaction between isoparaffins and olefins which comprises continuously injecting a vapor phase mixture of isoparaffins and olefins as bubbles into a body of liquid hydrogen fluoride in the first of a series of successively higher alkylation zones each containing a body of liquid hydrogen fluoride, continuously transferring hydrocarbons from above the said body of liquid hydrogen fluoride in each of said zones except the uppermost to the zone next thereabove by vaporizing said hydrocarbons and injecting the vapors so produced into the body of liquid hydrogen fluoride in said next zone, adding additional hydrocarbon reactants to the hydrocarbons so transferred and vaporizing and injecting the vapors of said additional hydrocarbon reactants with the said transferred hydrocarbons, continuously supplying fresh liquid hydrogen fluoride to the body thereof in the uppermost of said zones, continuously transferring liquid hydrogen fluoride from the body thereof in each of said zones except the lowermost to the zone next therebelow, continuously removing liquid hydrogen fluoride from the body thereof in the lowermost of said zones and continuously removing from the series liquid hydrocarbon reaction mixture resulting from injection of vapor phase hydrocarbons into said bodies of liquid hydrogen fluoride in series as aforesaid and recovering alkylate product from said reaction mixture.

JAMES B. KIRKPATRICK.
CARLETON H. SCHLESMAN.
ARLIE A. O'KELLY.

REFERENCES CITED

The following references are of record in the file of this patent:

UNITED STATES PATENTS

| Number | Name | Date |
|---|---|---|
| 1,625,195 | Dickey | Apr. 19, 1927 |
| 2,009,347 | Sheldon | July 23, 1935 |
| 2,091,645 | McConnell | Aug. 31, 1937 |
| 2,173,452 | Merley | Sept. 19, 1939 |
| 2,380,010 | Arnold | July 10, 1945 |
| 2,374,262 | Anderson | Apr. 24, 1945 |
| 2,260,990 | Goldsby et al. | Oct. 28, 1941 |

FOREIGN PATENTS

| Number | Country | Date |
|---|---|---|
| 32,355 | Austria | Mar. 26, 1908 |